(12) United States Patent
Parivar et al.

(10) Patent No.: US 10,712,799 B2
(45) Date of Patent: *Jul. 14, 2020

(54) INTELLIGENT MANAGEMENT FOR AN ELECTRONIC DEVICE

(71) Applicant: Apple Inc., Cupertino, CA (US)

(72) Inventors: Nima Parivar, South San Francisco, CA (US); Kelsey Y. Ho, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/655,112

(22) Filed: Jul. 20, 2017

(65) Prior Publication Data
US 2017/0315602 A1 Nov. 2, 2017

Related U.S. Application Data

(60) Continuation of application No. 14/598,044, filed on Jan. 15, 2015, now Pat. No. 9,740,268, which is a (Continued)

(51) Int. Cl.
| | |
|---|---|
| *G06F 9/46* | (2006.01) |
| *G06F 1/3215* | (2019.01) |
| *G06F 1/3231* | (2019.01) |
| *H04W 52/02* | (2009.01) |
| *G06F 3/041* | (2006.01) |

(52) U.S. Cl.
CPC .......... *G06F 1/3215* (2013.01); *G06F 1/3231* (2013.01); *G06F 3/041* (2013.01); *H04W 52/027* (2013.01); *Y02D 10/173* (2018.01); *Y02D 70/00* (2018.01)

(58) Field of Classification Search
None
See application file for complete search history.

(56) References Cited

U.S. PATENT DOCUMENTS

| 5,231,381 A | 7/1993 | Duwaer |
| 5,483,261 A | 1/1996 | Yasutake |
| (Continued) | | |

FOREIGN PATENT DOCUMENTS

| CN | 1263385 A | 8/2000 |
| EP | 1 650 938 A1 | 4/2006 |
| (Continued) | | |

OTHER PUBLICATIONS

CN Office Action received for CN Patent Application No. 201410051717.9, dated May 27, 2015, 8 pages. (3 pages of English Translation and 5 pages of Official Copy.).

(Continued)

*Primary Examiner* — Gregory A Kessler
(74) *Attorney, Agent, or Firm* — Kubota & Basol LLP

(57) ABSTRACT

An electronic device is disclosed. The electronic device includes a first input device; a second input device capable of operating in a first operating mode; and a system management module in communication with the first input device and the second input device. The system management module is configured for switching the second input device to a second operating mode in response to detecting, by the first input device, a presence of a user without receiving any operation-specific input from the user.

32 Claims, 6 Drawing Sheets

Related U.S. Application Data division of application No. 12/852,056, filed on Aug. 6, 2010, now abandoned.

(56) References Cited

U.S. PATENT DOCUMENTS

| | | | |
|---|---|---|---|
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,108,028 | A | 8/2000 | Skarbo et al. |
| 6,188,391 | B1 | 2/2001 | Seely et al. |
| 6,208,330 | B1 | 3/2001 | Hasegawa |
| 6,246,862 | B1 | 6/2001 | Grivas et al. |
| 6,310,610 | B1 | 10/2001 | Beaton et al. |
| 6,323,846 | B1 | 11/2001 | Westerman et al. |
| 6,384,852 | B1 | 5/2002 | Ye et al. |
| 6,690,387 | B2 | 2/2004 | Zimmerman et al. |
| 6,856,259 | B1 | 2/2005 | Sharp |
| 6,915,143 | B2 | 7/2005 | Kashu et al. |
| 6,983,169 | B2 | 1/2006 | Vogel et al. |
| 7,015,894 | B2 | 3/2006 | Morohoshi |
| 7,016,705 | B2 | 3/2006 | Bahl et al. |
| 7,184,064 | B2 | 2/2007 | Zimmerman et al. |
| 7,633,076 | B2 | 12/2009 | Huppi et al. |
| 7,663,607 | B2 | 2/2010 | Hotelling et al. |
| 7,752,623 | B1* | 7/2010 | Crawford, Jr. ......... G06F 9/505 718/1 |
| 7,916,473 | B2 | 3/2011 | Jang |
| 8,019,390 | B2 | 9/2011 | Sindhu |
| 8,130,211 | B2 | 3/2012 | Abernathy |
| 8,479,122 | B2 | 7/2013 | Hotelling et al. |
| 8,614,431 | B2 | 12/2013 | Huppi |
| 9,389,729 | B2 | 7/2016 | Huppi |
| 9,619,079 | B2 | 4/2017 | Huppi |
| 2003/0085870 | A1 | 5/2003 | Hinckley |
| 2004/0163003 | A1 | 8/2004 | Dutton et al. |
| 2004/0176047 | A1 | 9/2004 | Trively |
| 2004/0180649 | A1 | 9/2004 | Vogel et al. |
| 2004/0233153 | A1 | 11/2004 | Robinson |
| 2005/0138576 | A1* | 6/2005 | Baumert ............... G06F 1/1632 715/862 |
| 2006/0026521 | A1 | 2/2006 | Hotelling et al. |
| 2006/0060762 | A1 | 3/2006 | Chan et al. |
| 2006/0101293 | A1 | 5/2006 | Chandley et al. |
| 2006/0166702 | A1 | 7/2006 | Dietz et al. |
| 2006/0174201 | A1* | 8/2006 | Zaner-Godsey ......... H04L 67/24 715/736 |
| 2006/0197753 | A1 | 9/2006 | Hotelling |
| 2006/0279548 | A1 | 12/2006 | Geaghan |
| 2007/0054651 | A1 | 3/2007 | Farmer et al. |
| 2007/0075965 | A1 | 4/2007 | Huppi et al. |
| 2007/0085157 | A1 | 4/2007 | Fadell et al. |
| 2007/0100480 | A1 | 5/2007 | Sinclair et al. |
| 2007/0288779 | A1 | 12/2007 | Kim |
| 2008/0158172 | A1 | 7/2008 | Hotelling et al. |
| 2008/0204359 | A1 | 8/2008 | Tsui et al. |
| 2008/0297487 | A1 | 12/2008 | Hotelling et al. |
| 2009/0019448 | A1 | 1/2009 | Bouge et al. |
| 2009/0048709 | A1 | 2/2009 | DeLine |
| 2009/0140863 | A1 | 6/2009 | Liu et al. |
| 2009/0322683 | A1 | 12/2009 | Tsuji et al. |
| 2010/0048256 | A1 | 2/2010 | Huppi et al. |
| 2010/0079508 | A1 | 4/2010 | Hodge et al. |
| 2010/0134423 | A1 | 6/2010 | Brisebois et al. |
| 2010/0138680 | A1 | 6/2010 | Brisebois et al. |
| 2010/0153553 | A1* | 6/2010 | Sheth ................. H04L 67/1095 709/226 |
| 2010/0156790 | A1 | 6/2010 | Su et al. |
| 2010/0164887 | A1 | 7/2010 | Nakamura |
| 2011/0163976 | A1 | 7/2011 | Barnhoefer et al. |
| 2012/0032894 | A1 | 2/2012 | Parivar et al. |
| 2014/0104241 | A1 | 4/2014 | Huppi et al. |
| 2015/0130739 | A1 | 5/2015 | Parivar et al. |
| 2016/0320907 | A1 | 11/2016 | Huppi et al. |
| 2017/0220199 | A1 | 8/2017 | Huppi et al. |

FOREIGN PATENT DOCUMENTS

| | | |
|---|---|---|
| EP | 2 081 113 A2 | 7/2009 |
| EP | 2 081 113 A3 | 7/2009 |
| GB | 2 346 500 A | 8/2000 |
| JP | 9-18566 A | 1/1997 |
| JP | 2000-163031 A | 6/2000 |
| JP | 2000-286924 A | 10/2000 |
| JP | 2001-352395 A | 12/2001 |
| JP | 2002-057791 A | 2/2002 |
| JP | 2002-342033 A | 11/2002 |
| JP | 2003-219024 A | 7/2003 |
| JP | 2003-309644 A | 10/2003 |
| JP | 2003-345476 A | 12/2003 |
| JP | 2004-159028 A | 6/2004 |
| JP | 2005-223629 A | 8/2005 |
| KR | 10-2005-0113650 A | 12/2005 |
| TW | 200 919 281 A | 5/2009 |
| WO | WO-2005/101176 A2 | 10/2005 |
| WO | WO-2009/062176 | 5/2009 |
| WO | 2009/062176 A3 | 7/2009 |
| WO | WO-2009/096643 A1 | 8/2009 |
| WO | WO-2010/051001 A1 | 5/2010 |
| WO | WO-2012/019153 A1 | 2/2012 |

OTHER PUBLICATIONS

Final Office Action dated Nov. 19, 2009, for U.S. Appl. No. 11/620,702, 12 pages.

Final Office Action dated Nov. 15, 2010, for U.S. Appl. No. 11/650,014, 16 pages.

International Preliminary Report on Patentability received for PCT Patent Application No. PCT/US1993/012666, dated Mar. 1, 1995, 5 pages.

International Preliminary Report on Patentability received for PCT Patent Application No. PCT/US1993/012637, dated Apr. 10, 1995, 5 pages.

International Preliminary Report on Patentability received for PCT Patent Application No. PCT/US1994/011011, dated Feb. 28, 1996, 4 pages.

International Preliminary Report on Patentability received for PCT Patent Application No. PCT/US1995/008369, dated Oct. 9, 1996, 4 pages.

International Preliminary Report on Patentability received for PCT Application No. PCT/US2007/022335, dated May 7, 2009.

International Preliminary Report on Patentability dated May 28, 2009, for PCT Application No. PCT/US2007/023124, 8 pages.

International Preliminary Report on Patentability received for PCT Application No. PCT/US2007/026130, dated Jul. 16, 2009, 11 pages.

International Preliminary Report on Patentability dated Jul. 16, 2009, for PCT Application No. PCT/US2007/026141.

International Preliminary Report on Patentability dated Jul. 16, 2009, for PCT Application No. PCT/US2007/026164.

International Search Report and Written Opinion received for PCT Patent Application No. PCT/US2007/022335, dated Feb. 18, 2008, 15 pages.

International Search Report and Written Opinion dated Jun. 3, 2008, for PCT Application No. PCT/US2007/026164.

International Search Report and Written Opinion received for PCT Patent Application No. PCT/US2007/023124, dated Jul. 3, 2008, 10 pages.

International Search Report and Written Opinion received for PCT Patent Application No. PCT/US2007/026130, dated Aug. 21, 2008, 12 pages.

International Search Report and Written Opinion received for PCT Patent Application No. PCT/US2011/020861, dated Nov. 29, 2011, 15 pages.

International Search Report received for PCT Patent Application No. PCT/US1993/012666, dated Nov. 9, 1994, 8 pages.

International Search Report received for PCT Patent Application No. PCT/US1994/11011, dated Feb. 8, 1995, 3 pages.

International Search Report received for PCT Patent Application No. PCT/US1995/008369, dated Nov. 8, 1995, 6 pages.

(56) References Cited

OTHER PUBLICATIONS

Non-Final Office Action dated Mar. 31, 2009, for U.S. Appl. No. 11/586,862, filed Oct. 24, 2006, 11 pages.
Non-Final Office Action dated Sep. 29, 2009, for U.S. Appl. No. 11/638,251, seven pages.
Non-Final Office Action dated Mar. 8, 2010, for U.S. Appl. No. 11/620,702, 16 pages.
Non-Final Office Action dated Mar. 22, 2010, for U.S. Appl. No. 11/638,251, 11 pages.
Non-Final Office Action dated May 18, 2010, for U.S. Appl. No. 11/871,725, 11 pages.
Non-Final Office Action dated May 24, 2010, for U.S. Appl. No. 11/650,014, 16 pages.
Non-Final Office Action dated Oct. 27, 2010, for U.S. Appl. No. 11/871,725, 26 pages.
Non-Final Office Action dated Nov. 15, 2010, for U.S. Appl. No. 11/770,614, 16 pages.
Non-Final Office Action dated Jun. 6, 2013, for U.S. Appl. No. 12/613,439, filed Nov. 5, 2009, 9 pages.
Non-Final Office Action dated Aug. 11, 2016, for U.S. Appl. No. 15/207,260, filed Jul. 11, 2016, eight pages.
Notice of Allowance received for Canadian Patent Application No. 2,812,011, dated Jan. 5, 2016, 1 page.
Notice of Allowance received for Chinese Patent Application No. 201410051717.9, dated Feb. 3, 2016, 4 pages (2 pages English Translation and 2 pages of Official Copy.).
Notice of Allowance dated Sep. 15, 2009, for U.S. Appl. No. 11/586,862, filed Oct. 24, 2006, six pages.
Notice of Allowance dated Oct. 2, 2013, for U.S. Appl. No. 12/613,439, filed Nov. 5, 2009, nine pages.
Notice of Allowance dated Mar. 11, 2016, for U.S. Appl. No. 14/137,837, filed Dec. 20, 2013, eight pages.
Notice of Allowance dated Nov. 23, 2016, for U.S. Appl. No. 15/207,260, filed Jul. 11, 2016, eight pages.
Notice of Allowance dated Jan. 5, 2018, for U.S. Appl. No. 15/484,018, filed Apr. 10, 2017, eight pages.
Notice of Allowance received for Japanese Patent Application No. 2013-087347, dated Jan. 5, 2016, 3 pages (Official copy only.).
Office Action received for Canadian Patent Application No. 2,812,011, dated Nov. 24, 2014, 5 pages.
Office Action received for Chinese Patent Application No. 201410051717.9, dated May 27, 2015, 8 pages (3 pages of English Translation and 5 pages of Official Copy.).
Office Action received for European Patent Application No. 07839698.3, dated Jun. 8, 2011, 6 pages.
Office Action received for European Patent Application No. 07839698.3, dated Mar. 2, 2012, 6 pages.
Office Action received for European Patent Application No. 07839698.3, dated Aug. 13, 2013, 6 pages.
Office Action received for Indian Patent Application No. 2571/DELNP/2009, dated Sep. 30, 2016, 8 pages.
Office Action received for Japanese Patent Application No. 2013-087347, dated Apr. 8, 2014, 4 pages. (English Translation only.).
Office Action received for Japanese Patent Application No. 2013-087347, dated Mar. 30, 2015, 9 pages. (6 pages of English Translation and 3 pages of Official Copy.).
Office Action received for Japanese Patent Application No. 2015-150013, dated Feb. 3, 2017, 10 pages (5 pages of English Translation and 5 pages of Official Copy.).
Supplemental European Search Report dated Apr. 21, 2011 for EP Appln. No. 07863192.6, 8 pages.
Final Office Action dated Nov. 23, 2012, for U.S. Appl. No. 12/852,056, filed Aug. 6, 2010, 13 pages.
Final Office Action dated Apr. 8, 2014, for U.S. Appl. No. 12/852,056, filed Aug. 6, 2010, 13 pages.
International Search Report dated Dec. 2, 2011, for PCT Application No. PCT/US2011/046840, filed Aug. 5, 2011, seven pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final office Action dated Jul. 6, 2012, for U.S. Appl. No. 12/852,056, filed Aug. 6, 2010, 14 pages.
Non-Final office Action dated Oct. 18, 2013, for U.S. Appl. No. 12/852,056, filed Aug. 6, 2010, 14 pages.
Non-Final office Action dated Aug. 25, 2014, for U.S. Appl. No. 12/852,056, filed Aug. 6, 2010, 14 pages.
Non-Final office Action dated Oct. 31, 2016, for U.S. Appl. No. 14/598,044, filed Jan. 15, 2015, twelve pages.
Notice of Allowance dated Apr. 20, 2017, for U.S. Appl. No. 14/598,044, filed Jan. 15, 2015, five pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Decision to Grant received for European Patent Application No. 13169672.6, dated Jun. 14, 2019, 2 pages.
Non-Final Office Action received for U.S. Appl. No. 15/484,018, dated Jun. 1, 2017, 6 pages.
Restriction Requirement received for U.S. Appl. No. 11/586,862, dated Feb. 24, 2009, 6 pages.
Restriction Requirement received for U.S. Appl. No. 12/852,056, dated May 9, 2012, 5 pages.

\* cited by examiner

INTELLIGENT MANAGEMENT FOR AN ELECTRONIC DEVICE

CROSS-REFERENCE TO RELATED APPLICATIONS

This application is a continuation of U.S. patent application Ser. No. 14/598,044 (now U.S. Publication No. 2015-0130739), filed on Jan. 15, 2015, which is a divisional of U.S. patent application Ser. No. 12/852,056 (now Abandoned), filed Aug. 6, 2010, the entire disclosure of which is incorporated herein by reference for all purposes.

FIELD

This relates generally to managing the operating mode of an electronic device, and more specifically, to detecting user presence and/or behavior using one or more sensors of an electronic device and managing the operating mode of the device based on the detected user presence and/or behavior.

BACKGROUND

Many modern electronic devices are designed to automatically adjust their operating mode based on the presence or absence of user activities detected by the devices. For example, a computer may dim its screen, display a screensaver, or switch to a sleep/low power mode if no user activity is detected for a predetermined period of time. This can be done using an internal timer which tracks the duration of the idle state of the computer. Conversely, a user-initiated input event such as a movement of the mouse, a stroke on the keyboard, or a gesture detected on a touch pad may cause the computer to switch back to a full operating mode and be responsive to the various user inputs.

However, this timer-based management system is not flawless. For example, this type of system assumes that the system can switch to a power-saving mode when no user interaction is detected via the system's input devices. That may not be true, for example, when a user is reading from a device with a large screen that can display large amount of content without requiring the user to scroll up and down frequently. Another example is when a user is watching a movie on a handheld device. In this case, although the user is not actively interacting with the device (e.g., typing or moving the cursor around), the device should preferably remain in normal operation mode. If the device automatically displays a screen saver, dims the screen, or goes into sleep mode based on the idle-duration timer, it may become an inconvenience for the user who has to make some type of input every so often to switch the device back to its normal operating mode so that he can resume watching the movie.

In addition, existing device management systems are designed to manage the operating mode of the device as a whole, but not the operating mode of the individual component or applications running on the device. That is, there are often only a limited number of operating modes available for a particular device. For example, a desktop computer may only have four different operating modes: a normal mode, screensaver mode, sleep mode (i.e., low-power mode), and off mode. A handheld device such as a MP3 player or a cellular phone may have a normal mode, a dim mode (i.e., low-power mode), and an off mode. There is typically one setting for each of the available modes in terms of which components of the device are left on and which ones can be turned off. As a result, it is difficult to achieve optimal efficiency given the limited number of operating modes available.

As electronic devices become more and more sophisticated, they may include more hardware components such as a touch pad, touch screen, accelerometer, camera, etc, each of which can be a source of power consumption. Similarly, multiple software applications can run on a device and demand limited system resources such as memory and processor power at the same time. Thus, an internal management system that can intelligently manage the device at a component level and/or application level based on user presence and behavior is highly desirable.

SUMMARY

This generally relates to detecting a user's presence and/or behavior using one or more sensors of an electronic device, and managing the operating mode of the device at a component/application level based on the detected presence and/or behavior to improve usability and efficiency of the device.

To prevent unwanted interruptions that can be detrimental to user experience, a device management module of an electronic device can be programmed to detect the presence of a user even in the absence of any operation-specific user input. In various embodiments, this can be achieved using one or more sensors of the same or different types embedded in the one or more input devices.

For example, the device management module can use both an idle-duration timer and non-operation-specific proximity data from the input devices to determine whether to switch the device to a different operation mode. The device can start off operating in a normal operating mode which requires at least most of the components of the device to be powered up and fully operational. If the device has not been idle for more than a predetermined period of time, the device management module can take no actions and keep the device in its normal operating mode. If the device management module determines that the device has been idle for more than the predetermined period of time, it can then check to see if proximity data is being received by any of the input devices. Because the system is in an idle state, the received proximity data can be interpreted as a continued presence of the user even though no substantive input from the user is being received. Thus, the device management module can again maintain the normal operating mode of the system. In contrast, if none of the input devices senses a touch, the device management module can then switch the system to a power-saving mode, a screen saver mode, some other mode or even a shutdown mode because it may be unlikely that the user is still present and actively engaged in the use of the system.

In another embodiment, the device management module can do more than maintaining or switching the operating mode of the device based on the presence or the lack of proximity data while the system is idle. The device management module can also manage the mode of individual components of the system and/or the status of one or more applications running on the system. In another embodiment, the device management module can also manage the allocation of system resources among multiple applications running on the system.

DETAILED DESCRIPTION

In the following description, reference is made to the accompanying drawings which form a part hereof, and in which it is shown by way of illustration specific embodiments in which the disclosure can be practiced. It is to be understood that other embodiments can be used and structural changes can be made without departing from the scope of the embodiments of this disclosure.

This generally relates to detecting a user's presence and/or behavior using one or more sensors of an electronic device, and managing the operating mode of the device at a component/application level based on the detected presence and/or behavior to improve usability and efficiency of the device.

Figure 1:
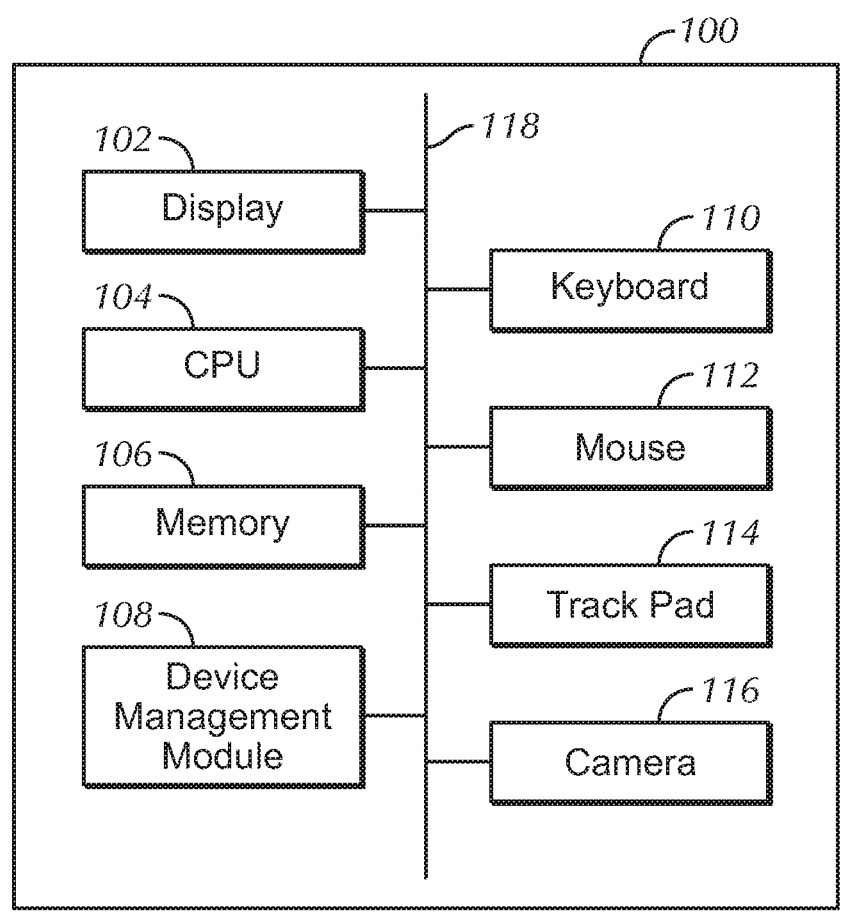
FIG. 1 illustrates the exemplary components of a computer system including a device management module according to embodiments of the disclosure.

In one embodiment, the electronic device can be a desktop or laptop computer system. As illustrated in FIG. 1, the computer system 100 can include a display 102, a central processing unit (CPU) 104, a memory 106, a device management module 108, one or more input devices such as a keyboard 110, mouse 112, trackpad 114, and camera 116, all in communication with each other via, for example, internal buses, external wires, wireless protocols, or any other means known in the art 118. Although the keyboard, mouse, and track pad are all shown in FIG. 1, it should be understood that a particular desktop or laptop may not be equipped with all three. A desktop or laptop computer system can also include input devices other than the three shown in FIG. 1. A user can interact with the computer system 100 via each of the input devices. Typically, as mentioned above, if the computer system 100 receives no user input from any of its input devices for a certain period of time, the device management module may switch the system 100 from a full operating mode to a power-saving mode. This may not be ideal if the user is in fact still reading an article or watching a movie from the display 102 or generally being attentive to the system, even though no operation-specific input such as a mouse click or a gesture on the trackpad is being received from the user.

To prevent unwanted interruptions that can be detrimental to user experience, the device management module 108 can be programmed to detect the presence of a user even in the absence of any operation-specific user input. In various embodiments, this can be achieved using one or more sensors of the same or different types embedded in the one or more input devices.

Figure 2A:
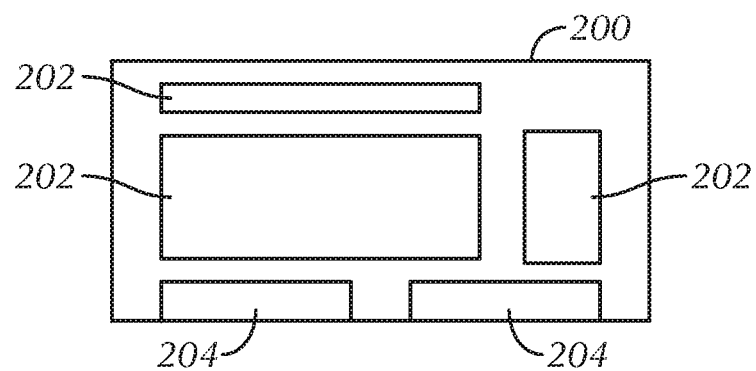
FIG. 2a illustrates a keyboard including at least one touch panel adapted to detect a user touch according to embodiments of the disclosure.
Figure 2B:
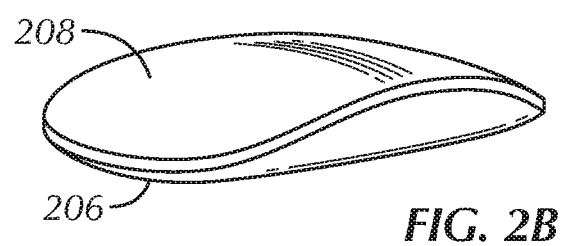
FIG. 2b illustrates a mouse including a touch surface adapted to detect a user touch according to embodiments of the disclosure.
Figure 2C:
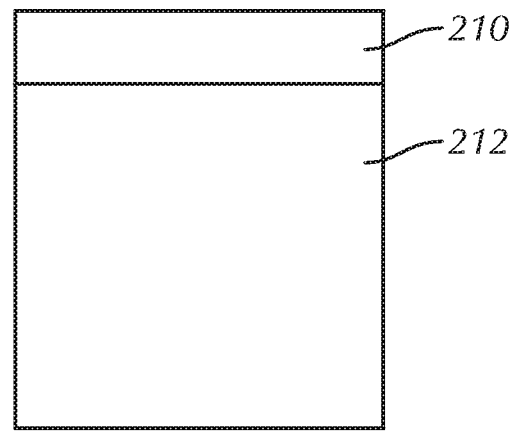
FIG. 2c illustrates a trackpad including a touch surface adapted to detect a user touch according to embodiments of the disclosure.

One type of sensor that can be found in many electronic devices today is a touch sensor. For example, touch sensors can be incorporated into input devices such as touchpads, touch screens, keyboards (e.g., FingerWorks' Touchstream keyboard), mice (e.g., the Apple Magic Mouse), and trackpads (e.g., the Apple Magic Trackpad). FIGS. 2a-c illustrate an exemplary touch-based keyboard, mouse, and trackpad, respectively. The keyboard 200 of FIG. 2a can include touch sensors at the palm-resting location 204. The keys 202 of the keyboard 200 can also include touch sensors. Accordingly, the keyboard 200 can detect touches and/or hovering (near-touches) (collectively, proximity detection) by a user's fingers and/or palms even when the user is just resting his hands on or over the keyboard without pressing any keys or making any meaningful inputs.

The mouse 206 of FIG. 2b can similarly include touch sensors overlapping at least part of its surface to form a touch surface 208. The touch surface 208 can allow a user to perform various simple and complicated gestures as input to the system. When the user is simply resting his hand over the mouse (e.g., holding the mouse) or making minor negligible movements without performing any gestures or other meaningful input, the touch surface can still capture the resulting touch data.

FIG. 2c illustrates a touch-based trackpad 210 including a similar touch surface 212 capable of detecting touches and/or near-touches and gestures from a user. The user can also rest or hover his fingers or other parts of his hands on the touch surface 212. The touch or near-touch by the user's resting fingers or hand can be captured without generating any meaningful input to the system to which the trackpad 210 is connected.

Referring back to FIG. 1, the keyboard 110, mouse 112, and trackpad 114 of the computer system 100 can be the touch-based keyboard 200, mouse 206, and trackpad 210 of FIGS. 2a-c, respectively. In addition, the display 102 can be a touch screen. The device management module can utilize the proximity data received from any of the keyboard 110, mouse 112, track pad 114, and the touch screen of the display 102 to determine whether a user is present even when the proximity data does not correspond to any meaningful input (i.e., input that can trigger a specific operation to be performed). If it is determined that the user is present based on the fact that the touch surface of any of these input devices 102, 110, 112, 114 indicates the detection a touch or near-touch, the device management module 108 can maintain the current operating mode of the computer system by simply taking no actions and postponing the activation of the screen saver or power-saving mode or other mode. This can provide a more seamless user experience for the user who may be reading or watching a movie from the display 110 and resting his hands on one of the touch-based input devices 102, 110, 112, 114.

Figure 3:
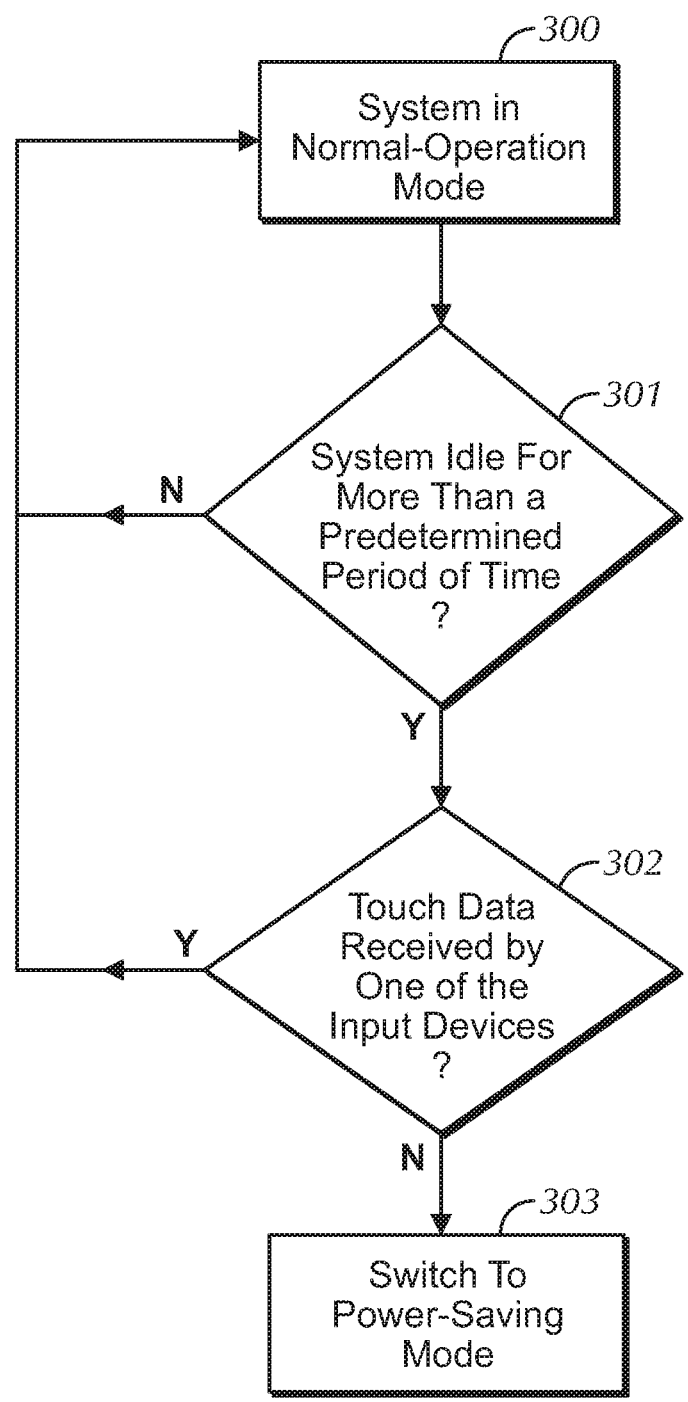
FIG. 3 is a flow chart illustrating exemplary steps in a process to manage the operating model of a device according to embodiments of the disclosure.

FIG. 3 illustrates the steps of an exemplary process that can be carried out by the device management module 108 to manage the operating mode of the device 100. In this example, the device management module 108 can use both an idle-duration timer and non-operation-specific proximity data from the input devices to determine whether to switch the device to a different operation mode. As illustrated, the device can start off operating in a normal operating mode which requires at least most of the components of the device to be powered up and fully operational (step 300). If the device has not been idle for more than a predetermined period of time, the device management module can take no actions and keep the device in its normal operating mode (step 301). If the device management module determines that the device has been idle for more than the predetermined period of time, it can then check to see if proximity data is being received by any of the input devices (step 302). Because the system is in an idle state, the received proximity data can be interpreted as a continued presence of the user even though no substantive input from the user is being received. Thus, the device management module can again maintain the normal operating mode of the system. In contrast, if none of the input devices senses a touch, the device management module can then switch the system to a power-saving mode, a screen saver mode, some other mode or even a shutdown mode because it may be unlikely that the user is still present and actively engaged in the use of the system (step 303).

To more accurately determine if a user is indeed present, other types of sensors such as the camera 116 of FIG. 1 can also collect data regarding the user's presence. The image data captured by the camera can supplement the proximity data collected by the touch-based input devices, or vice versa, to verify the user's presence. Thus, embodiments of the disclosure can utilize the proximity data to better manage the operating mode of the device to provide an improved experience for the user.

In another embodiment, the device management module can do more than maintaining or switching the operating mode of the device based on the presence or the lack of proximity data while the system is idle. The device management module can also manage the mode of individual components of the system and/or the status of one or more applications running on the system. For example, if the keyboard 110 of the computer system 100 of FIG. 1 detects proximity data reflecting that the user has both of his hands resting on the palm rest of the keyboard, the device management module 108 can remotely turn off the mouse 112 and/or the trackpad 114 (or switch them to a low-power mode) because when the user has both hands resting on the keyboard, it is highly unlikely that the mouse and/or the track pad would also be in use at the same time. Similarly, if the user is holding the mouse 112 or resting his hand on the trackpad 114, the device management module 108 can turn off the keyboard 110. By managing the operating mode of each individual component, such as the keyboard 110, mouse 112, and trackpad 114, the device management module 108 can reduce the overall power consumption by the system without negatively affecting the usability of the system.

In another embodiment, the device management module 108 can also manage the allocation of system resources among multiple applications running on the system 100. For example, if one of the applications is a word processor application but there is no touch or near-touch detected by the keyboard 110, the mouse 112, and the trackpad 114, the device management module 108 can temporarily suspend the word processor application by, for example, moving it to the background behind other applications or minimizing it so that more screen space on the display can be allocated to other applications. Alternatively or additionally, the device management module 108 can devote less CPU cycles and/or memory to the word processor application. The extra resources can be given to other applications running on the system. If a touch is detected on the keyboard or the mouse, the word processor application can automatically be reactivated or moved to the foreground. Other types of applications can be managed similarly to increase the efficiency of the overall computer system. As another example, a game application may be suspended if none of the devices being used to play the game is receiving any user input or even detecting the presence of a user.

Figure 4:
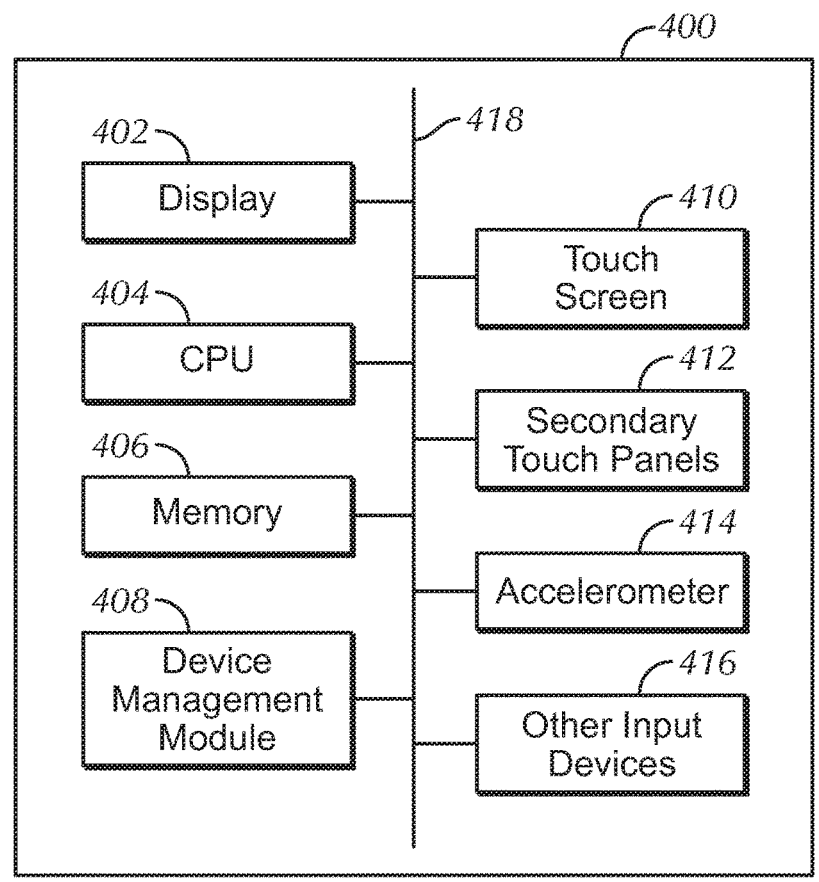
FIG. 4 illustrates the exemplary components of a tablet personal computer (PC) including a device management module according to embodiments of the disclosure.

The concept disclosed in the embodiment above with respect to a desktop or laptop computer system can also be applied to other electronic devices such as the tablet PC of FIG. 4. FIG. 4 illustrates various example components of tablet PC 400 including a display 402, CPU 404, memory 406, device management module 408, touch screen 410, one or more secondary proximity sensors or panels 412 having one or more touch and/or near-touch sensors, accelerometer 414, and other input devices 416, all in communication with each other via, for example, internal buses, external wires, wireless protocols, or any other means known in the art 418. Although the touch screen 410, secondary touch and/or near-touch sensors or panels 412, accelerometer 414, and other input devices 416 are all shown in FIG. 1, it should be understood that a particular tablet PC may not be equipped with all these components.

Typically, if the touch screen 410 does not detect any touch input from a user for a certain period of time, the tablet PC 400 can enter a dim mode in which the backlight of the display 402 is dimmed to reduce power consumption by the display 402. Alternatively or additionally, the entire device can be switched to a low-power mode such as a sleep mode or an off mode if the touch screen does not receive any input from the user. However, as previously discussed, the absence of any touch or near-touch on the touch screen 410, which can be the main input device of the tablet PC 400, does not necessarily mean that the user is no longer using the tablet PC 400. He or she may still be reading or watching a movie from the display. According to the same concepts disclosed in the embodiments above, other types of user input can be used to determine whether a user is still present but simply not interacting with the touch screen 410.

Figures 5A, 5B:
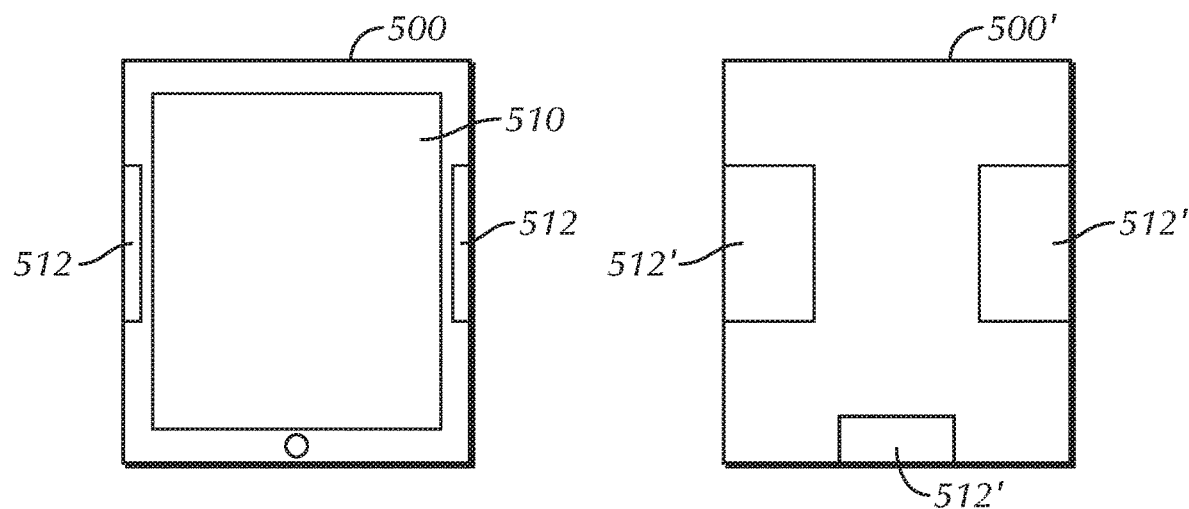
FIGS. 5a and 5b are the front and back view of an embodiment of the tablet PC of FIG. 4 according to embodiments of the disclosure.

FIGS. 5a and 5b illustrate an exemplary embodiment of the tablet PC which includes one or more secondary touch and/or near-touch sensors or panels in addition to the main touch screen interface. FIG. 5a illustrates the front view of the exemplary tablet PC 500. The secondary touch and/or near-touch sensor or panel 512 can be placed along both edges of the tablet PC 500 where a user is most likely to be holding the device 500. Although not shown in FIG. 5a, additional or alternative touch and/or near-touch sensors or panels can also be incorporated, for example, along the top and bottom edges of the device to detect a user holding the tablet PC in a landscape orientation.

FIG. 5b provides a rear view of the same exemplary tablet PC 500. As shown, additional or alternative secondary touch and/or near-touch sensors or panels 512' can also be placed on the backside of the tablet PC 500 at locations which would allow detection of a user holding the tablet PC 500. In other embodiments, the secondary touch and/or near-touch sensors or panels can wrap around the side of the tablet PC 500 so long as a user touch or near-touch can be detected when the user is holding the device even though no input is being entered via the touch screen 510. In one embodiment, the secondary touch and/or near touch sensors or panels 512, 512' of FIGS. 5a and 5b can have less touch and/or near-touch resolution or capability then the touch screen 510 because all that the secondary touch panels 512, 512' are needed for is to detect user's hands holding the tablet PC 500 without further recognizing any particular movement or gesture.

Referring back to FIG. 4, the exemplary secondary touch and/or near-touch sensors or panels 412 of tablet PC 400 can be those shown in FIGS. 5a and 5b. Accordingly, the device management module 408 can determine based on proximity data received from the secondary touch and/or near-touch panels 412 whether the user is holding the tablet PC 400. If so, the device management module 408 can prevent the tablet PC 400 to be switched into a dim mode or any power-saving mode or other mode even though user input has not been detected on the touch screen 410 for a period of time. However, if no touch and/or near-touch is detected by either the touch screen 410 or the secondary touch and/or near-touch sensors or panels 412 for a predetermined period of time, the device management module 408 can then switch the device into a lower power or off mode to conserve battery. Other types of input devices such as the accelerometer 414 can also assist in determining whether a user is present and using the device.

In addition, the device management module 408 can also manage the operating mode of individual components and/or applications of the tablet PC 400. For example, if the only user input is being detected by the secondary touch and/or near-touch sensors or panels 412 at both edges of tablet PC 400, the touch sensor panel of the touch screen 410 can then be turned off to conserve battery power because the proximity data from the secondary touch panels 412 can be interpreted as indicating that the tablet PC 400 is being held by the user with both of his/her hands. Other components such as the wireless antenna (not shown), which is also likely not being used when the user is holding the tablet PC with both of his hands, can also be turned off. As another example, if the accelerometer 414 detects movement of the tablet PC 400, the secondary touch and/or near-touch sensors or panels 412 can be switched off because the movement alone can be sufficient enough to show that the user is actively using the device. Similarly, the accelerometer 414 can be turned off if the secondary touch and/or near-touch sensors or panels detect no touches by the user indicating that the device is not being held by the user. By managing the operating mode of individual components, the device management module 408 can reduce power consumption by those components not in use and thus allow the device to have a longer battery life.

The device management module 408 can similarly manage the applications running on the tablet PC 400. For example, if the secondary touch and/or near-touch sensors or panels 412 detect that the user is holding the tablet PC 400 with both of his hands, any type of virtual input graphic user interface (GUI) such as a virtual keyboard or a virtual scroll wheel being displayed on the display 402 can be hidden. As soon as the touch or near-touch is no longer detected by at least one of the secondary touch and/or near-touch sensors or panels 412, the virtual keyboard or virtual scroll wheel can reappear on the display 418 so that the user can manipulate them using the touch screen 410. Again, these methods for intelligently managing the applications may improve user experience significantly.

Figure 6A:
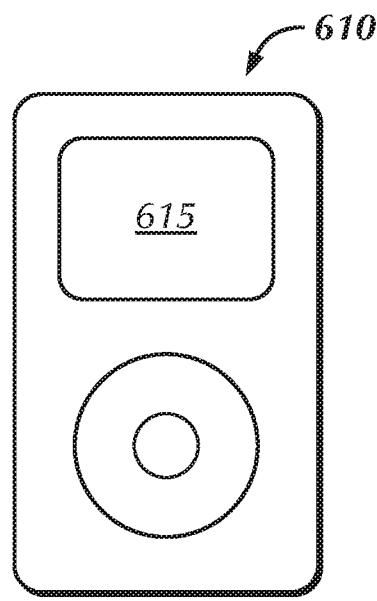
FIG. 6a illustrates an exemplary digital media player that can incorporate device management according to embodiments of the disclosure.
Figure 6B:
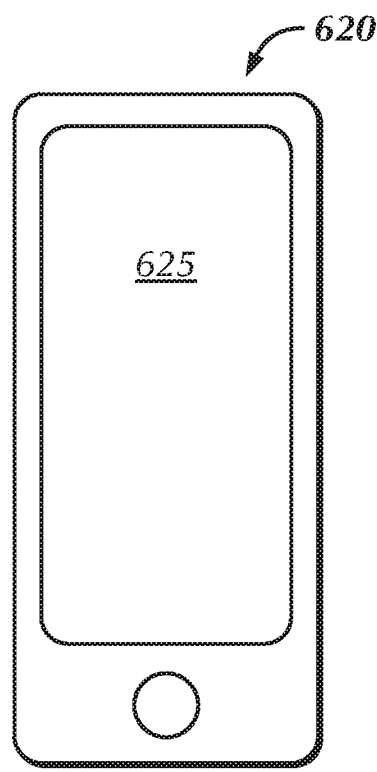
FIG. 6b illustrates an exemplary mobile telephone that can incorporate device management according to embodiments of the disclosure.

Although FIGS. 4, 5a and 5b illustrates a tablet PC, similar features disclosed in the embodiments above can be easily incorporated into other types of handheld electronic devices such as MP3 players and cellular phones to achieve the same goal. For example, FIG. 6A illustrates exemplary digital media player 610 that can include device management according to embodiments of the disclosure. FIG. 6B illustrates exemplary mobile telephone 620 that can include device management according to embodiments of the disclosure.

In fact, the disclosed concept of managing operating mode of a device at a component and/or application level can be useful to any electronic devices capable of detecting user presence and/or behavior to improve usability and efficiency of the device and reduce power consumption.

The device management module of the above-disclosed embodiments can be implemented in hardware, firmware, software, or a combination of any of the three. For example, the device management module can be implemented in firmware stored in memory and executed by a processor The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

The various operating modes of a device or components of a device can include, but is not limited to, a full operating mode in which the device (or component) can be in a full power mode, an idle mode in which some of the components of the device may not operating at normal speed, a sleep mode in which the device can be set to power-saving mode in which all but the most essential components can be turned off; and a power-down mode in which the device can be essentially turned-off completely. In other embodiments, the different modes can dictate processor speed and the allocation of other resource distribution of the device among the various components and applications.

Figure 7:
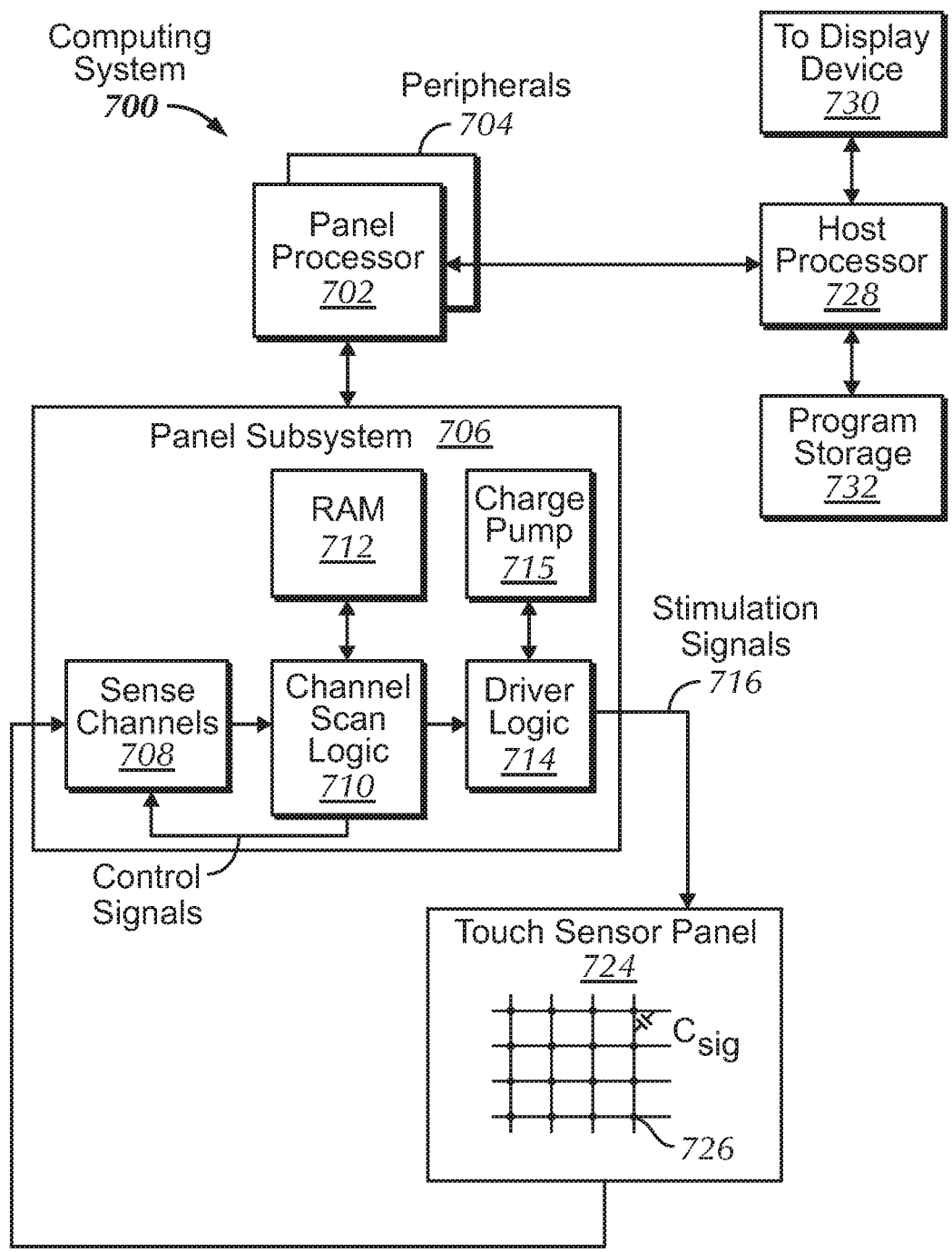
FIG. 7 illustrates an exemplary computing system that can incorporate device management according to embodiments of the disclosure.

As described above, touch-based input devices such as touch screens and touch panels can be one type of device used for determining user presence and behavior. These touch-based input devices can use any existing touch technologies including, but not limited to, capacitive, resistive, in infrared and acoustic touch technologies. FIG. 7 illustrates exemplary computing system 700 according to embodiments of the disclosure. The system 700 can include one or more touch sensor panels according to the embodiments of the disclosure described above. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to drive lines of touch sensor panel 724. In some embodiments, panel subsystem 706, panel processor 702 and peripherals 704 can be integrated into a single application specific integrated circuit (ASIC).

Touch sensor panel 724 can include a capacitive sensing medium having a plurality of drive lines and a plurality of sense lines, although other sensing media can also be used. Either or both of the drive and sense lines can be coupled to a thin glass sheet according to embodiments of the disclosure. Each intersection of drive and sense lines can represent a capacitive sensing node and can be viewed as picture element (pixel) 726, which can be particularly useful when touch sensor panel 724 is viewed as capturing an "image" of touch. (In other words, after panel subsystem 706 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 724 can drive sense channel 708 (also referred to herein as an event detection and demodulation circuit) in panel subsystem 706.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/ or the like. Host processor 728 can also perform additional functions that may not be related to panel processing, and can be coupled to program storage 732 and display device 730 such as an LCD panel for providing a UI to a user of the device. Display device 730 together with touch sensor panel 724, when located partially or entirely under the touch sensor panel, can form touch screen 718.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An electronic device comprising:
   one or more processors configured to run one or more applications on the electronic device; and
   a first proximity sensor coupled to the processor, wherein the one or more processors are further configured to:
   allocate system resources of the electronic device to the one or more applications based on whether or not first proximity data indicative of user presence is detected at the first proximity sensor:
   in accordance with a determination that the first proximity data indicative of user presence is detected at the first proximity sensor, display a first application in a foreground of a display area; and
   in accordance with a determination that the first proximity data indicative of user presence is not detected at the first proximity sensor, forgo displaying the first application in the foreground of the display area.

2. The electronic device of claim 1, wherein the device management module is configured to increase an amount of system resources allocated to the first application when the first proximity sensor receives proximity data.

3. The electronic device of claim 2, wherein increasing the amount of system resources allocated to the first application comprises increasing processor or memory resources to the second application.

4. The electronic device of claim 1, further comprising a first input device, wherein the first proximity sensor is included in the first input device wherein the device management module increases an amount of system resources to the first application based on a determination that the first application is configured to receive input from the first input device.

5. The electronic device of claim 1, further comprising a second proximity sensor, wherein the device management module is further configured to:
   in accordance with a determination that second proximity data indicative of user presence is detected at the second proximity sensor, forgo displaying the first application in the foreground of the display.

6. The electronic device of claim 1, wherein the one or more processors are further configured to:
   in accordance with the determination that the first proximity data indicative of user presence is not detected at the first proximity sensor, run the first application in an idle mode.

7. The electronic device of claim 1, further comprising:
   a second proximity sensor incorporated into a second input device, wherein:
   the first proximity sensor is incorporated into a first input device,
   the method further comprises:
   in accordance with a determination that second proximity data indicative of user presence is detected at the second proximity sensor, forgoing displaying the first application in the foreground of the display area.

8. The electronic device of claim 7, wherein the first application is configured to be controlled by the first input device.

9. The electronic device of claim 1, wherein the one or more processors are further configured to:
   in accordance with a determination that second proximity data indicative of user presences is detected at a second proximity sensor different from the first proximity sensor, forgo displaying the first application in the foreground of the display area.

10. The electronic device of claim 1, wherein:
the first proximity sensor is incorporated into a first input device,
the electronic device further includes a second proximity sensor incorporated into a second input device, and
the one or more processors are further configured to:
in accordance with the determination that the first proximity data indicative of user presence is detected at the first proximity sensor:
run a second application in an idle mode in response to the first proximity data; and
suspend the second application in response to running the second application in the idle mode; and
in accordance with a determination that second proximity data indicative of user presence is detected at the second proximity sensor:
run the first application in an idle mode in response to the second proximity data; and
suspend the first application in response to running the first application in the idle mode.

11. The electronic device of claim 1, wherein the first application is a game application and the first input device is a device used to play the game.

12. The electronic device of claim 11, wherein the one or more processors are further configured to, in accordance with a determination that the first proximity data indicative of user presence is not detected at the first proximity sensor, display a second application in the foreground of the display area.

13. A method for managing one or more applications running on an electronic device, comprising:
detecting first proximity data indicative of user presence using a first proximity sensor of the electronic device;
in accordance with a determination that the first proximity data indicative of user presence is detected at the first proximity sensor, displaying a first application in a foreground of a display area; and
in accordance with a determination that the first proximity data indicative of user presence is not detected at the first proximity sensor, forgoing displaying the first application in the foreground of the display area.

14. The method of claim 13, further comprising:
increasing an amount of system resources allocated to the first application when the first proximity sensor receives proximity data.

15. The method of claim 13, further comprising:
detecting second proximity data indicative of user presence at a second proximity sensor; and
in accordance with a determination that second the proximity data indicative of user presence is detected at the second proximity sensor, forgo displaying the first application in the foreground of the display.

16. The method of claim 13, further comprising:
in accordance with the determination that the first proximity data indicative of user presence is not detected at the first proximity sensor, running the first application in an idle mode.

17. The method of claim 13, further comprising:
in accordance with a determination that second proximity data indicative of user presence is detected at a second proximity sensor, forgoing displaying the first application in the foreground of the display area, wherein:
the first proximity sensor is incorporated into a first input device, and
the second proximity sensor is incorporated into a second input device.

18. The method of claim 17, wherein the first application is configured to be controlled by the first input device.

19. The method of claim 13, further comprising:
in accordance with a determination that second proximity data indicative of user presences is detected at a second proximity sensor different from the first proximity sensor, forgoing displaying the first application in the foreground of the display area.

20. The method of claim 13, wherein:
the first proximity sensor is incorporated into a first input device,
the electronic device further includes a second proximity sensor incorporated into a second input device, and
the method further comprises:
in accordance with the determination that the first proximity data indicative of user presence is detected at the first proximity sensor:
running a second application in an idle mode in response to the first proximity data; and
suspending the second application in response to running the second application in the idle mode; and
in accordance with a determination that second proximity data indicative of user presence is detected at the second proximity sensor:
running the first application in an idle mode in response to the second proximity data; and
suspending the first application in response to running the first application in the idle mode.

21. The method of claim 13, wherein the first application is a game application and the first input device is a device used to play the game.

22. The method of claim 21, further comprising, in accordance with a determination that the first proximity data indicative of user presence is not detected at the first proximity sensor, displaying a second application in the foreground of the display area.

23. A non-transitory computer-readable medium storing instructions for performing a method for managing one or more applications running on an electronic device, the method comprising:
detecting first proximity data indicative of user presence using a first proximity sensor of the electronic device,
in accordance with a determination that the first proximity data indicative of user presence is detected at the first proximity sensor, displaying a first application in a foreground of a display area, and
in accordance with a determination that the first proximity data indicative of user presence is not detected at the first proximity sensor, forgoing displaying the first application in the foreground of the display area.

24. The non-transitory computer-readable medium of claim 23, wherein the method further comprises:
increasing an amount of system resources allocated to the first application when the first proximity sensor receives proximity data.

25. The non-transitory computer-readable medium of claim 23, wherein the method further comprises:
detecting second proximity data indicative of user presence at a second proximity sensor; and
in accordance with a determination that second the proximity data indicative of user presence is detected at the second proximity sensor, forgo displaying the first application in the foreground of the display.

26. The non-transitory computer-readable medium of claim 23, wherein the method further comprises:

in accordance with the determination that the first proximity data indicative of user presence is not detected at the first proximity sensor, running the first application in an idle mode.

27. The non-transitory computer-readable medium of claim 23, wherein the method further comprises:
in accordance with a determination that second proximity data indicative of user presence is detected at a second proximity sensor, forgoing displaying the first application in the foreground of the display area, wherein:
the first proximity sensor is incorporated into a first input device, and
the second proximity sensor is incorporated into a second input device.

28. The non-transitory computer-readable medium of claim 27, wherein the first application is configured to be controlled by the first input device.

29. The non-transitory computer-readable medium of claim 23, wherein the method further comprises:
in accordance with a determination that second proximity data indicative of user presences is detected at a second proximity sensor different from the first proximity sensor, forgoing displaying the first application in the foreground of the display area.

30. The non-transitory computer-readable medium of claim 23, wherein:
the first proximity sensor is incorporated into a first input device,
the electronic device further includes a second proximity sensor incorporated into a second input device, and
the method further comprises:
in accordance with the determination that the first proximity data indicative of user presence is detected at the first proximity sensor:
running a second application in an idle mode in response to the first proximity data; and
suspending the second application in response to running the second application in the idle mode; and
in accordance with a determination that second proximity data indicative of user presence is detected at the second proximity sensor:
running the first application in an idle mode in response to the second proximity data; and
suspending the first application in response to running the first application in the idle mode.

31. The non-transitory computer-readable medium of claim 23, wherein the first application is a game application and the first input device is a device used to play the game.

32. The non-transitory computer-readable medium of claim 23, wherein the method further comprises, in accordance with a determination that the first proximity data indicative of user presence is not detected at the first proximity sensor, displaying a second application in the foreground of the display area.

* * * * *

UNITED STATES PATENT AND TRADEMARK OFFICE
CERTIFICATE OF CORRECTION

PATENT NO.        : 10,712,799 B2
APPLICATION NO.   : 15/655112
DATED             : July 14, 2020
INVENTOR(S)       : Nima Parivar et al.

Page 1 of 1

It is certified that error appears in the above-identified patent and that said Letters Patent is hereby corrected as shown below:

In the Claims

In Column 12, Line 44, in Claim 23, delete "device," and insert -- device; --.

In Column 12, Line 48, in Claim 23, delete "area," and insert -- area; --.

Signed and Sealed this
First Day of September, 2020

Andrei Iancu
*Director of the United States Patent and Trademark Office*